United States Patent [19]

Jennings

[11] Patent Number: 5,199,527
[45] Date of Patent: Apr. 6, 1993

[54] TREE STAND AND BRACKET

[76] Inventor: Dwight M. Jennings, R.F.D. 5, Trinity, N.C. 27370

[21] Appl. No.: 833,888

[22] Filed: Feb. 11, 1992

[51] Int. Cl.$^5$ ................................................. A45F 3/26
[52] U.S. Cl. ..................................... 182/187; 182/92; 248/219.4
[58] Field of Search ........................ 182/187, 188, 92; 248/219.4

[56] References Cited

U.S. PATENT DOCUMENTS

| | | | |
|---|---|---|---|
| 806,963 | 12/1905 | Evans | 182/188 |
| 2,060,953 | 11/1936 | Strom | 182/187 |
| 2,982,337 | 5/1961 | Arena | 182/187 |
| 4,475,627 | 10/1984 | Eastridge | 182/187 |
| 4,708,221 | 11/1987 | Kubiak | 182/187 |
| 4,830,143 | 5/1989 | Fisher | 182/135 |
| 4,905,792 | 3/1990 | Wilson | 182/187 |
| 5,009,283 | 4/1991 | Prejean | 182/187 |
| 5,060,756 | 10/1991 | D'Acquisto | 182/187 |
| 5,105,910 | 4/1992 | Engstrom | 182/187 |

Primary Examiner—Alvin C. Chin-Shue
Attorney, Agent, or Firm—Rhodes, Coats & Bennett

[57] ABSTRACT

A tree stand and an apparatus for securing the tree stand to a tree. The tree stand includes a bracket having a pair of spaced apart cleats located at each of its ends and a removable seating portion. A chain or the like is attached to the upper end of the bracket for encircling the tree. A slotted plate is welded to one side of the bracket for receiving the free end of the chain. A handle is attached to the lower end of the bracket. In operation, the chain is wrapped around the tree and engaged in the slotted plate. The handle is then pulled downward causing the chain to be tightened about the tree and both pairs of cleats to engage the tree surface. The seating portion of the tree stand is then inserted in the upper portion of the bracket and the weight of the stand keeps the bracket in position. The seating portion of the tree stand may be removed from the bracket as needed or moved to other trees having extra brackets as required.

10 Claims, 3 Drawing Sheets

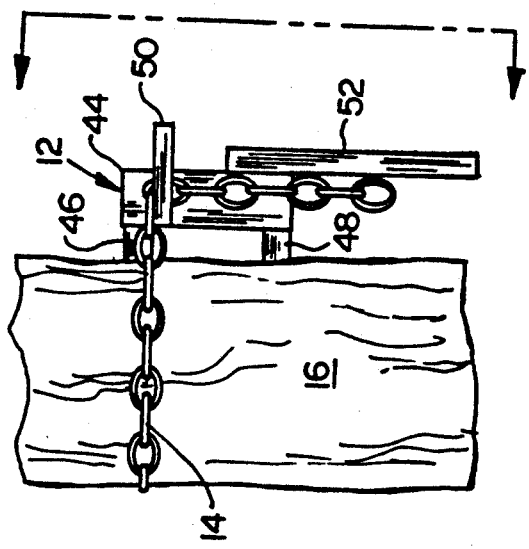
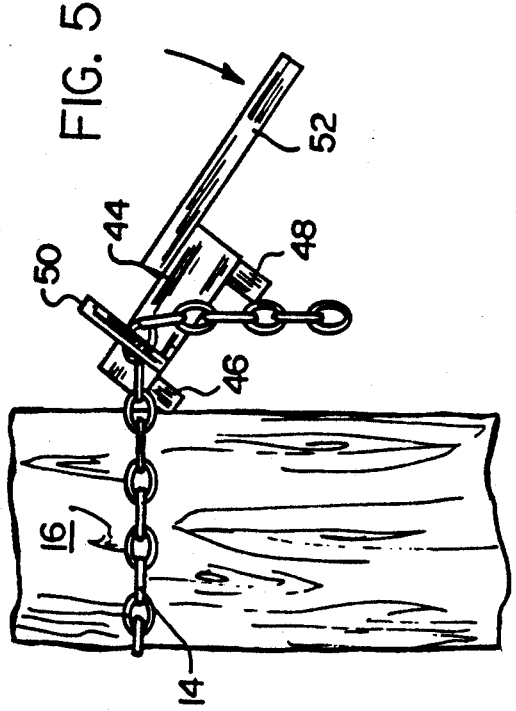
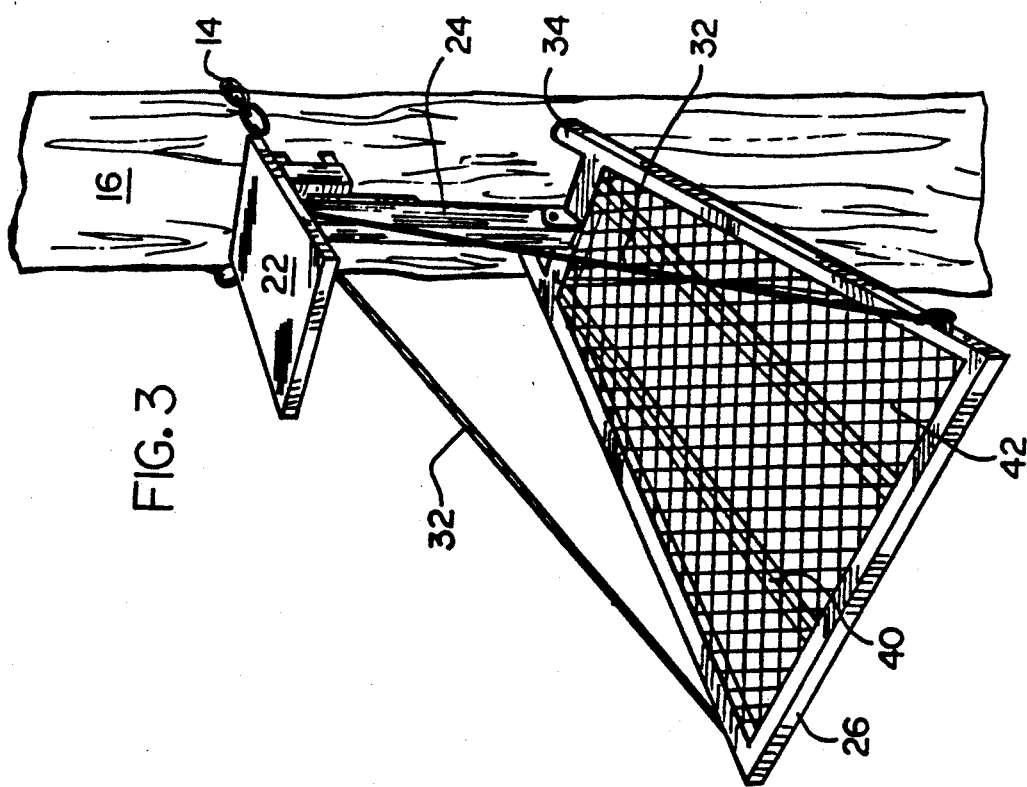

TREE STAND AND BRACKET

BACKGROUND OF THE INVENTION (1) Field of the Invention

The present invention relates generally to tree stands utilized by hunters and sportsman and, more particularly, to a tree stand having an improved tree fastening means therefor.

(2) Description of the Prior Art

A wide variety of portable tree stands are currently in use. Outdoorsmen such as campers, naturalists and hunters carry the tree stands into wooded areas and mount the seat to a tree at a suitable height. The tree stands are mounted at a high elevation on a tree to give the outdoorsman a wide field of view while at the same time shielding him from detection by forest wildlife. Tree stands can also be used to provide comfortable and convenient seating at a normal chair height.

Conventional tree stands are formed of a lightweight unitary construction to permit the outdoorsman to easily transport the stand into and out of the woods. However, in many cases, the outdoorsman has a favorite spot and will leave the stand in that location. Unfortunately, people being people, it is equally common to have tree stands left in the woods to be stolen by other outdoorsmen. Furthermore, it's also often desirable to move the tree stand from one location to the other but this action requires complete removal of the stand from the tree and relocation on the second tree.

U.S. Pat. No. 4,830,143, issued to Fisher, provides for a weight bearing device adapted to support objects upon vertically extending pole-shaped objects such as wooden poles and trees. The device comprises an anchoring strap and a forked unit fitted with a leveraged support frame. The strap is mounted at a pivotal site along the support frame. In use, the penetrating tips are aligned onto the pole-shaped object with the strap being looped about the pole and adjustably anchored onto the mount under sufficient tension to allow the major longitudinal axis of the fork unit to extend upwardly and outwardly therefrom. By downward force onto the support frame, the penetrating tips will swing inwardly and upwardly about the pivotal site causing the strap to grippingly tighten about the object and the tips to penetrate the object and therefore firmly anchor the weight bearing device thereto.

U.S. Pat. No. 4,475,627, issued to Eastridge, teaches a combination campstool and tree stand which has a chain and wedge bar combination that creates a stable mounting on a tree. Pivoting of the stand away from the tree increases tension in a chain and causes a wedge bar to engage a surface of a tree.

U.S. Pat. No. 4,915,792, issued to Wilson, is an example of a tree fastener for a tree stand having a continuously adjustable bolt and nut hooked in a tightening relationship with a flexible band such as a link chain.

Finally, U.S. Pat. No. 5,060,756, issued to D'Acquisto, discloses a portable tree stand for hunters which includes a one-piece supporting platform cast from a lightweight material. The grate-like pattern of the regular openings in the platform provides variable positioning support for different types of archery bows and enhances the ability of the platform to camouflage the tree stand.

However, none of the above known prior art devices provide any means for quickly attaching and detaching the stand to and from a tree which permits the stand to be removed from the tree and shifted to other trees or taken out of the woods as desired. Thus, there remains a need for a new and improved tree stand which may be removably attached to a tree and quickly reattached to a semi-permanently mounted bracket.

SUMMARY OF THE INVENTION

The present invention is directed to a tree stand and an apparatus for securing the tree stand to a tree. In the preferred embodiment, the invention includes a bracket having a pair of spaced apart cleats located at each of its ends. In the preferred embodiment, there is a stop between the two upper engaging cleats to prevent them from digging into the tree too deeply. A chain or the like is attached to the upper end of the bracket for encircling the tree. A slotted plate is welded to one side of the bracket for receiving the free end of the chain. A handle is attached to the lower end of the bracket.

In operation, the chain is wrapped around the tree and engaged in the slotted plate. The handle is then pulled downward causing the chain to be tightened about the tree and both pairs of cleats to engage the tree surface. The seating portion of the tree stand is then inserted in the upper portion of the bracket and the weight of the stand keeps the bracket in position. The seating portion of the tree stand may be removed from the bracket as needed or moved to other trees having extra brackets as required. If it's necessary to remove the bracket, the seating portion is first removed and then the handle is lifted up thereby releasing the tension on the chain. The chain can then be removed from the slotted plate and the bracket released from the tree.

Accordingly, one aspect of the present invention is to provide a tree stand or the like. The stand includes: (a) a bracket adapted to be attached to a tree or pole; (b) a stand for supporting at least one person, the stand including a horizontal support surface; and (c) means for selectively and releasability attaching the stand to the bracket.

Another aspect of the present invention is to provide a bracket or the like adapted to be attached to a tree or pole for receiving a stand. The bracket includes: (a) a tubular support, the tubular support including a means for selectively and releasability attaching the stand to the bracket; (b) a flexible connector having one end attached to one side of the tubular support; and (c) means attached to the opposite side of the tubular support for receiving the other end of the flexible connector.

Still another aspect of the present invention is to provide a tree stand or the like. The stand includes: (a) a bracket adapted to be attached to a tree or pole, the bracket including: (i) a tubular support; (ii) a flexible connector having one end attached to one side of the tubular support; and (iii) means attached to the opposite side of the tubular support for receiving the other end of the flexible connector; (b) a stand for supporting at least one person, the stand including a horizontal support surface; and (c) means for selectively and releasability attaching the stand to the bracket.

These and other aspects of the present invention will become apparent to those skilled in the art after a reading of the following description of the preferred embodiment when considered with the drawings.

BRIEF DESCRIPTION OF THE DRAWINGS

FIG. 3 is perspective view of the tree stand shown in FIG. 1;

FIG. 4 is an enlarged side view of the bracket portion of the tree stand shown in FIG. 1;

FIG. 5 is an enlarged side view illustrating the bracket portion of the tree stand prior to connection to the tree;

DESCRIPTION OF THE PREFERRED EMBODIMENTS

Figure 2:
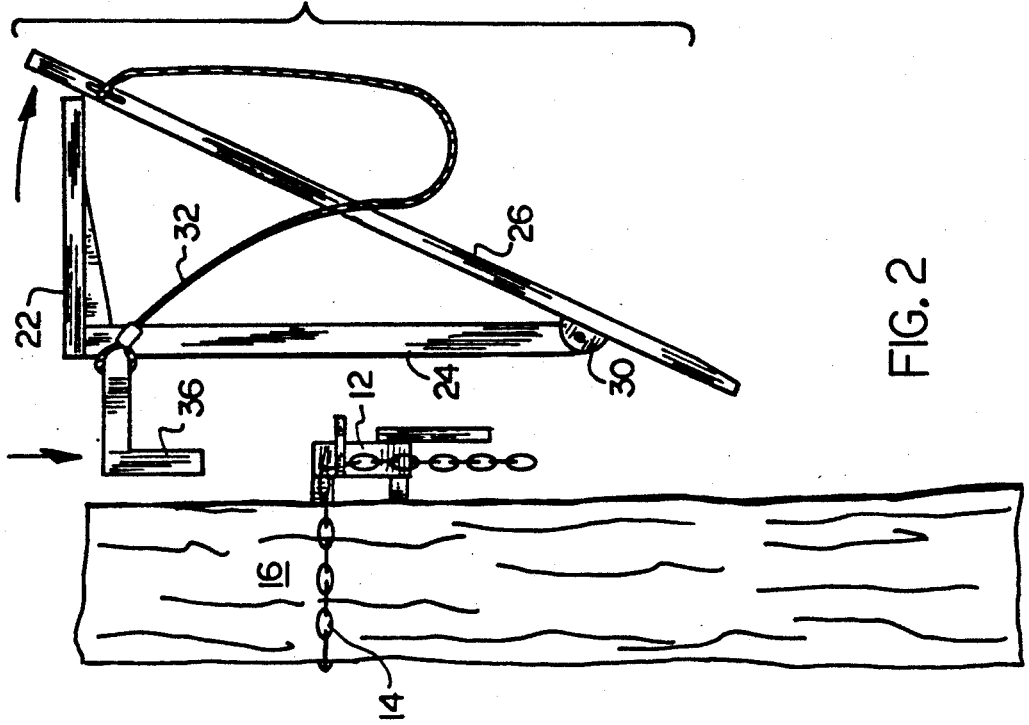
FIG. 2 is a side view illustrating the seating portion of the tree stand in its folded position prior to its connection to the bracket portion of the tree stand attached to the tree.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 1:
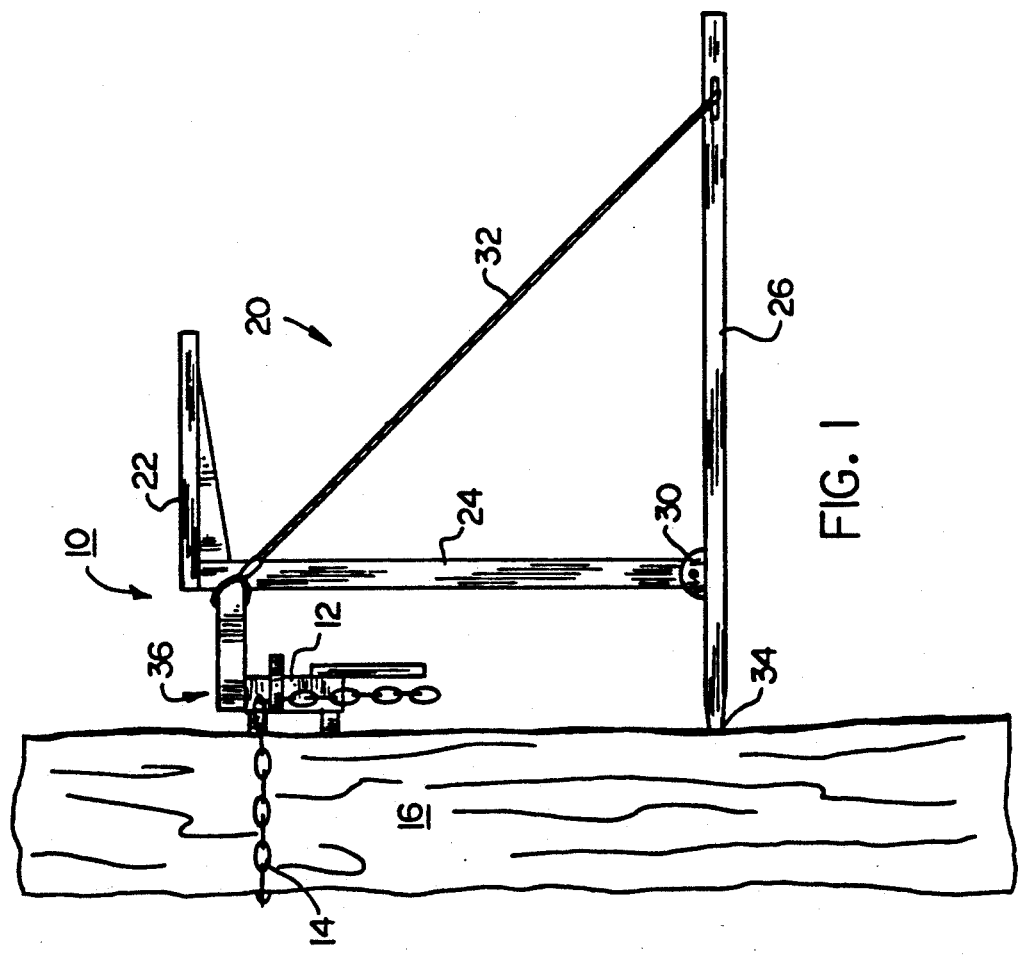
FIG. 1 is a side view of a tree stand constructed according to the present invention.

Referring now to the drawings in general and FIG. 1 in particular, it will be understood that the illustrations are for the purpose of describing a preferred embodiment of the invention and are not intended to limit the invention thereto. As best seen in FIG. 1, a tree stand, generally designated 10, is shown constructed according to the present invention. The tree stand 10 includes a bracket portion 12 attached by chain 14 to tree 16 and seating portion 20 which can be removably attached to bracket portion 12.

Seating portion 20 includes a seat 22 connected to one end of a frame 24 and a platform 26 connected to the other end of frame 24. Platform 26 is attached to the end of frame 24 at pivot point 30 which permits platform 26 to be folded up against seat 22. Cables 32 limit the extended position of platform 26 to a position approximately parallel to seat 22. Stabilizing spikes 34 are located at the end of platform 26 adjacent to pivot point 30 for contact with the surface of the tree. A hanger assembly 36 is attached to the frame 24 adjacent to seat 22 for engagement with bracket 12.

As best seen in FIG. 2, there is illustrated the seating portion 20 of the tree stand in its folded position prior to connection to the bracket portion 12 of the tree stand 10. As can be seen, bracket 12 is first attached to the tree as will be discussed in more detail later. Then seating portion 20 of the tree stand 10 is lifted upward and hanger 36 is moved downward until it engages bracket 12. At the same time, platform 26 is swung outwardly and downwardly until it is parallel to seat 22. In this position, stabilizer spikes 34 engage the surface of the tree 16.

Turning to FIG. 3, in the preferred embodiment, platform 26 is formed of a lightweight tubular framework 40 and covered with a lightweight open metal or plastic mesh 42.

Referring now to FIG. 4, there is shown an enlarged side view of the bracket portion 12 of the tree stand 10. Bracket portion 12 includes a tubular receiving portion 44 having a first pair of spaced apart cleats 46 attached to one end and a second pair of spaced apart cleats 48 attached to the other end. A slotted plate 50 is attached between the first and second pair of cleats 46,48. A handle 52 is attached to the tubular receiving portion 44.

As best seen in FIG. 5, in operation, chain 14 is first wrapped around tree 16 at the desired location on the tree and engaged in slot 50. First pair of cleats 46 act as a pivot point about which receiver 44 is rotated by downward movement of handle 52 until the second pair of cleats 48 engages the surface of tree 16.

Figure 6:
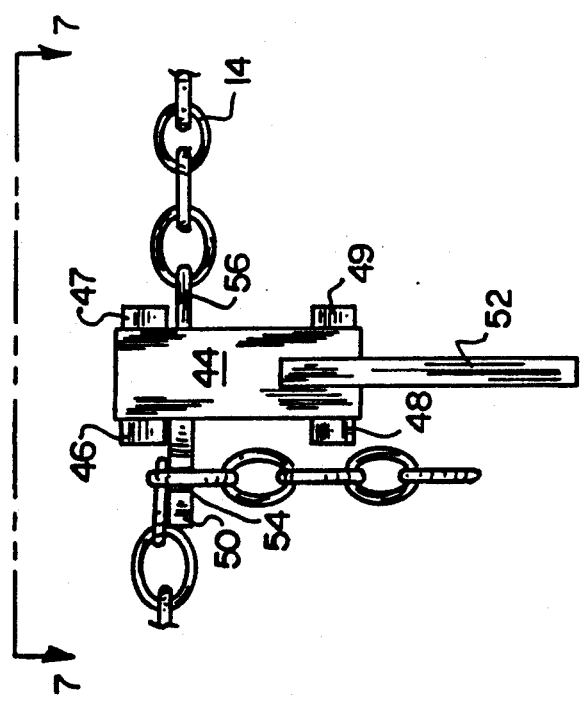
FIG. 6 is a front view of the bracket portion of the tree stand shown in FIG. 4, taken along lines 6—6.

Turning to FIG. 6, slotted plate 50 includes a slot 54 sized to receive chain 14. The other end of chain 14 is attached to tubular receiver 44 by link 56. As can be seen, in the preferred embodiment, first and second pairs of cleats 46,47 and 48,49 are spaced apart from the central portion of tubular receiver 44 to increase the stability of the bracket 12 and reduce the tendency of the bracket to twist about in tubular receiving portion 44.

Figure 7:
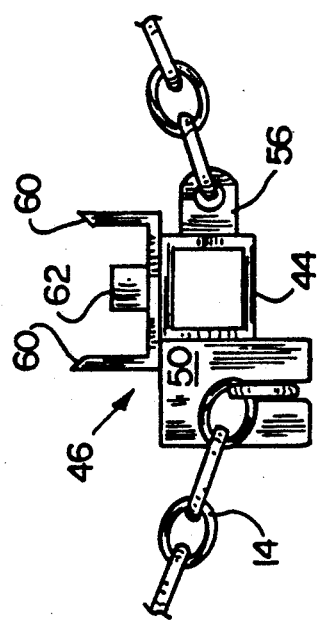
FIG. 7 is a top view of the bracket portion of the tree stand shown in FIG. 6, taken along lines 7—7.

Finally, as shown in FIG. 7, cleats 46,47 and 48,49 have tapered points 60 for engaging into the surface of tree 16. In addition, in the preferred embodiment, a stop 62 is located between cleats 46,47 for limiting the depth cleats 46,47 will enter into the tree.

In operation, chain 14 is wrapped around tree 16 and engaged in slotted plate 50. Handle 52 is then pulled downward causing chain 14 to be tightened about tree 16 and both pairs of cleats, 46,47 and 48,49 to engage the tree surface. Seating portion 20 of tree stand 10 is then inserted in the upper portion of bracket 12 and the weight of the seating portion keeps the bracket in position. The seating portion 20 of the tree stand may be removed from bracket 12 as needed or moved to other trees having extra brackets as required. If it's necessary to remove bracket 12, seating portion 20 is first removed and then handle 52 is lifted up thereby releasing the tension on chain 14. Chain 14 can then be removed from slotted plate 50 and the bracket released from tree 16.

Certain modifications and improvements will occur to those skilled in the art upon a reading of the foregoing description. By way of example, the seat portion may be hinged to allow the entire assembly to fold flat. Also, the position of the hanger may be moved downward on the frame to shorten the pivot point and increase the stability of the assembly. It should be understood that all such modifications and improvements have been deleted herein for the sake of conciseness and readability but are properly within the scope of the following claims.

I claim:

1. A tree stand or the like, said stand comprising:
   (a) a bracket adapted to be attached to a tree or pole, said bracket including: (i) a tubular support wherein said tubular support is an elongated tube having a first pair of spaced apart cleats at one end for engagement with the surface of the tree and a handle extending downward from said tubular support at the other end; (ii) a flexible connector having one end attached to one side of said tubular support; and (iii) means attached to the opposite side of said tubular support for receiving the other end of said flexible connector;
   (b) a stand for supporting at least one person, said stand including a frame, a seat connected to one end of said frame, and a platform connected to the other end of said frame; and (c) means for selectively and releasability attaching said stand to said bracket.

2. The apparatus according to claim 1, further including a pair of spikes located on said stand adjacent to the tree for engaging the surface of the tree and stabilizing said stand with respect to the tree.

3. The apparatus according to claim 1, wherein said platform is pivotally attached to said frame.

4. The apparatus according to claim 3, further including a pair of cables attached at one end to said frame and at the other end to said platform for limiting the movement of said platform between a folded position adjacent to said seat and an open, horizontal position for supporting at least one person.

5. The apparatus according to claim 1, wherein said means for selectively and releasability attaching said stand to said bracket includes a tubular section attached to said bracket and a hook attached to said stand.

6. The apparatus according to claim 5, wherein said tubular section attached to said bracket and said hook attached to said stand have complementary mating cross-sections to prevent rotation of said hook in said tubular section.

7. The apparatus according to claim 1, wherein said flexible connector is a length of chain.

8. The apparatus according to claim 1, wherein said means attached to the opposite side of said tubular support for receiving the other end of said flexible connector is a slotted plate.

9. The apparatus according to claim 1, further including a second pair of spaced apart cleats attached to said tubular support adjacent to said handle.

10. The apparatus according to claim 1, further including stop means attached to said tubular support between said first pair of spaced apart cleats.

* * * * *